Feb. 16, 1943.　　　J. R. CAMPBELL　　　2,310,934
THERMO-RESPONSIVE DEVICE
Filed Sept. 17, 1940
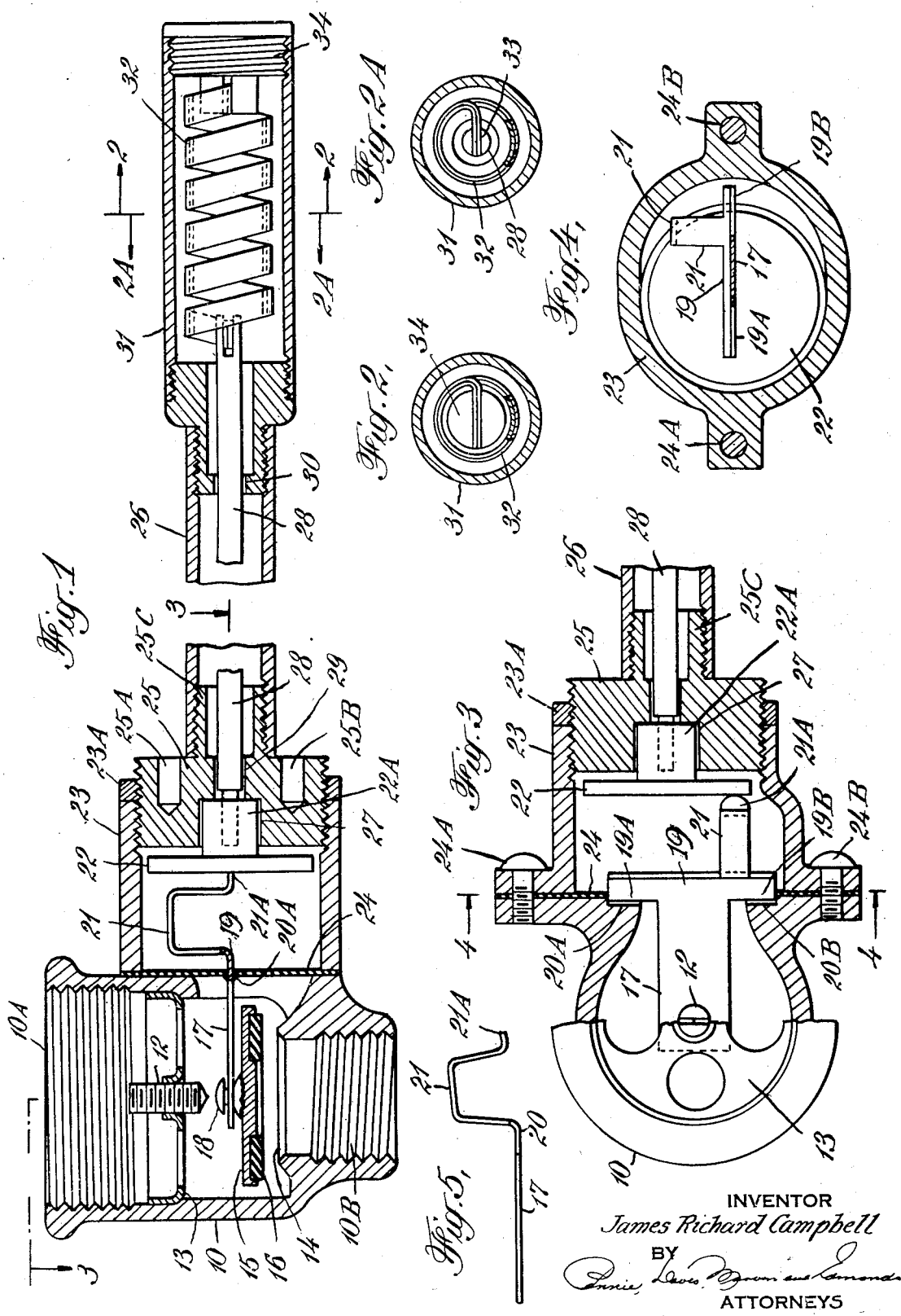
INVENTOR
James Richard Campbell
BY
ATTORNEYS Patented Feb. 16, 1943

2,310,934

UNITED STATES PATENT OFFICE 2,310,934

THERMO-RESPONSIVE DEVICE

James Richard Campbell, Altadena, Calif., assignor to The H. A. Wilson Company, Newark, N. J., a corporation of New Jersey Application September 17, 1940, Serial No. 357,083

13 Claims. (Cl. 236—48)

This invention is concerned with thermostatic control mechanisms and aims to provide improvements therein. More particularly, the invention contemplates a novel snap-action device for the thermostatic control of valves, switches and similar flow-interrupting means.

Devices for thermostatic control of flow-regulating mechanisms, such as valves, switches and the like, should be positive in action, simple and rugged in construction and should require but little adjustment even during long periods of service. The device of my invention fulfills these requirements, and depends for its positive action upon a spring, preferably a U-spring, an end of which bears eccentrically (i. e., off center) on a rotatable friction plate which is turned in one direction as an associated thermo-responsive element is heated and in the opposite direction as the element is cooled. As the plate is rotated, it tends to carry the end of the spring on its surface through a "dead center" position at which the spring is compressed, whereupon the spring snaps forward and operates an attached flow-interrupting means, such as a valve plate, or switch arm. If, thereafter, rotation of the plate in the same direction is continued, there is no further action on the spring, which is in an uncompressed state, and acts as an escapement until the plate starts to rotate in the opposite direction. When this occurs, the end of the spring catches on the plate and is carried back through the dead center and so snapped back to its original position. The action imparted to the valve or other closure means by the U-spring is abrupt and positive, and is particularly desirable for operating a safety valve in a fuel line which should be closed promptly and positively after extinction of an associated pilot light or the like.

In summary, my invention contemplates in a thermostatically-controlled flow-regulating mechanism, (such as a valve or switch), the combination which comprises means, such, for example, as a lever, adapted to open and close the mechanism, (valve, switch, or the like) a spring operatively connected with said means (as by mounting it on the lever), a rotatable friction plate against a major surface of which a free end of the spring bears off center, the axis of rotation of the plate being transverse to the surface against which the spring bears, a thermally-responsive element, (such as a bimetal), and means for rotating the friction plate in one direction as the element is heated and in the reverse direction as the element is cooled.

In its preferred form, the apparatus of my invention employs a bimetal strip (having sides that expand at different rates upon heating) wound in a helix with one end fixed and the other end rotatable as torque is imparted to the strip by changing temperature. The rotatable end of the strip is connected to the friction plate which, in consequence, is rotated in one direction as the temperature of the strip is raised and in the opposite direction as the strip is cooled. The valve employed has a plate which is pressed against a seat when the valve is shut and held away from the seat when the valve is open by means of an attached lever. The end of the lever opposite the valve plate carries a U-spring, the plane of which is substantially parallel to the plane of movement of the lever. One end of the U-spring is mounted on the lever, and the other extends outwardly and bears against the friction plate at a point off its center of rotation.

My invention will be more thoroughly understood in the light of the following detailed description taken in conjunction with the accompanying drawing in which:

Fig. 1 is a sectional elevation through a preferred form of the thermostatically-controlled valve mechanism of my invention;

Fig. 2 is a sectional view through a portion of the apparatus of Fig. 1 taken along the section line 2—2 toward the right;

Fig. 2A is a sectional view of the apparatus of Fig. 1 taken along the section line 2—2 toward the left;

Fig. 3 is a fragmentary plan view, partly in section, of the apparatus of Fig. 1 taken along the line 3—3;

Fig. 4 is a sectional view taken along the line 4—4 of Fig. 3; and

Fig. 5 is an elevational view of the U-spring of the apparatus of Figs. 1 to 4 in its uncompressed state.

Referring to the drawing, it will be observed that the apparatus comprises a valve having a body 10 with a relatively large threaded inlet 10A and a smaller threaded outlet 10B into which pipes (not shown) may be screwed. A valve throw adjusting screw 12 is disposed concentrically in the upper portion of the body and is held in a substantially vertical position by means of a supporting plate 13 that is flanged at its outside edge, the flange being press-fitted into the body. In the lower portion of the body adjacent the outlet is a valve seat 14 into or over which a valve plate or cap 15 is adapted to fit. The valve plate may be faced with resilient material such as oil-resistant synthetic rubber 16.

The valve plate is fastened to a lever or throw arm 17. The valve plate hangs downwardly from the throw arm, being suspended in this position by a screw 18 against which the adjusting screw 12 abuts when the valve is open. The throw arm or lever is supported at its fulcrum on an integrally formed axle 20 which extends as arms 19A, 19B on either side of the lever. The arms rest in V-shaped notches 20A, 20B in the valve body. The side of the lever opposite that to which the valve plate is attached is in the form of a U-spring 21. This U-spring may be formed integrally with the lever. The U-spring is relatively thin in cross-section and relatively wide and may be formed advantageously by bending a strip. It is disposed substantially parallel to the plane of movement of the lever with its free end projecting outwardly from the fulcrum (axle) of the lever. In the case illustrated, the U is inverted and disposed substantially vertical (see Fig. 1) and somewhat off-center of the lever (see Fig. 3). There is an outwardly extending projection or "catch" 21A on the free end of the U-spring which bears against a friction plate or drive wheel 22. The place of contact of the drive wheel and the free end or catch of the U-spring is off-center of the drive wheel, i. e., remote from its axis of rotation. Such a relationship may be attained by disposing the U-spring off-center of the lever, as shown in Fig. 3. The surface of the drive wheel is disposed transverse to the catch, and the axis of rotation of the drive wheel is in line with the major axis of the lever, i. e., transverse to the axle.

The U-spring and the friction plate are disposed in a housing 23 which may be cast integrally with the valve body or may be fastened thereto as in the instant case at a gasketed joint 24 by means of screws 24a, 24b. The housing is approximately cylindrical in cross section, and its outer end is closed by means of an end thrust adjustment screw and drive tube mounting 25. This member is threaded into the outer end of the housing and may be locked in a desired position by means of the lock nut 23A which bears against the end of the housing. Adjustment is accomplished by means of a spanner wrench which fits into holes 25A, 25B in the outer face of the adjustment screw. The adjustment screw has an externally threaded tubular projection 25C on the outside of which a drive tube or support 26 is threaded. The drive tube 26 abuts the main exposed face of the end thrust adjustment screw.

The inner face of the end thrust adjustment screw is bored concentrically to form a bearing 27 into which is fitted a cylindrical lug or shaft 22A formed integrally on the back of the friction plate. This lug acts as the axle of the friction plate. A drive shaft 28 extends through the drive tube and the end thrust adjustment screw along the axis of rotation of the friction plate 22 and has a squared end fitted into a corresponding hole in the end of the lug 22A. It is adapted to turn this lug and consequently the friction plate. The drive shaft turns freely in very loose bearings 29, 30, disposed, respectively, in the end thrust adjustment screw and in the drive tube. The bearing 29 is formed by boring a concentric hole through the end thrust adjustment screw. The bearing 30 is fastened within the drive tube remote from the end thrust adjustment screw.

The drive tube acts as a support for a housing 31 within which is disposed a thermally-responsive element 32, in this case a bimetallic helix, which is disposed substantially coaxially with the friction plate and the drive shaft. One end of the helix is fastened into a slot 33 in the end of the drive shaft. The other end of the helix is fastened into a slot in an end cap 34 which is threaded tightly into the end of the housing 31.

The apparatus just described may be made of any suitable materials. I have found, however, that the housing for the bimetal helix and appurtenant fittings preferably are made of stainless steel or other alloy adapted to withstand high temperature. The drive shaft should also be made of a heat-resistant alloy, say, stainless steel. The drive tube may be made of stainless steel or (in some instances) of brass or cold drawn steel tubing. The U-spring and valve throw are are made of resilient material and preferably are constructed of cold rolled "18–8" stainless steel. The balance of the parts may be made of bronze, brass, cold rolled steel or other suitable metal.

The particular dimensions of the apparatus will depend upon the service for which it is required. For control of a pilot valve on a gas burner, I have found that it is desirable to make the U-spring and the valve throw arm out of material having a thickness ranging from about .018 inch to .02 inch and the other parts proportional to these dimensions, as shown in the drawing. For the same service, I prefer to employ a bimetal helix having a developed length of 6 inches. The strip from which the helix is made should be .030 inch to .040 inch thick and about ⅛ inch wide.

The bimetal to employ will depend upon the temperatures prevailing in service. Generally speaking, the bimetal should be such as to produce pronounced deflection at as high a temperature as possible. For pilot control of gas burners, I prefer to employ a bimetal both sides of which are nickel steels capable of retaining their elasticity at elevated temperatures but having, of course, different rates of expansion upon heating.

The U-spring should be formed so that when compressed to operating position or dead center, as shown in Fig. 1, substantially all of its pressure will be exerted endwise, i. e., without an upward component or a downward component. This result is accomplished by making the unloaded spring in the form shown in Fig. 5.

To consider the operation of the apparatus of my invention, it will be observed that the bimetal helix is freely suspended in the housing and that its right hand end is in a fixed position by reason of being attached to the housing end cap. If a flame from a pilot burner impinges on the housing, both housing and bimetal helix will be heated, producing a twisting of the bimetal helix with resultant rotation of the drive shaft. The drive shaft turns the friction plate which, in turn, engages near its periphery the free end of the U-spring. If the direction of rotation of the friction plate is such that it tends to compress the spring, the free end of the spring will "catch" and be carried to dead center and will snap or "kick" through this position, thus opening or closing the valve. After the spring has kicked over, further motion of the drive plate in the direction that produced the "kick-over" will not produce further motion of spring or valve lever. But, if the direction of rotation is reversed, the spring will cease to act as an escapement; its free end will "catch" on the friction plate and the spring will be carried back over dead center so as to snap and thus bring the valve to its original closed or open position.

To consider the apparatus as applied to the control of a safety valve in a fuel line to a gas burner, let it be assumed that the housing containing the bimetal helix is disposed adjacent a pilot burner in a firebox. This pilot burner is adapted to ignite a main burner in the firebox, and the valve is disposed in the fuel line to this burner with a view to interrupting the main supply of fuel if the pilot burner should become extinguished, thus preventing waste and hazard attendant upon escape of unignited fuel. In this situation, the valve will be open and the valve plate in a raised position when the bimetal helix is heated to a desired temperature by the pilot flame. With the valve open, the U-spring will be in a low position, i. e., its free end will be below the dead center position shown in Fig. 1.

The arrangement of the helix is such that as it cools it will turn the friction plate in a clockwise direction (viewed from the right hand of Fig. 1) and as the friction plate turns it will catch the free end of the U-spring, carry it upward to or over dead center and cause it to snap upward. This upward snap seats the valve plate and closes the valve. When the pilot light is reignited, the helix will be heated, and the friction plate will be turned counterclockwise so that the U-spring snaps downward and opens the valve on the main fuel line.

As noted above, if heating continues so that the friction plate continues to rotate counterclockwise after the spring has snapped down and opened the valve, the spring merely acts as an escapement and the plate slides with respect to it. Consequently, the bimetal may be heated to a high temperature without putting further stress on the U-spring.

The action of the valve is principally dependent upon the direction of rotation of the helix and is relatively independent to the amount of such rotation or its starting point. In consequence, the apparatus remains in adjustment even if the bimetal takes a permanent set, i. e., becomes permanently distorted due to heating. Moreover, the rate of rotation is unimportant since the spring will snap whether the friction plate turns fast or slow.

Adjustment of the valve involves setting the adjustment screw for the valve throw arm, i. e., the screw 12, to permit a proper gap for the movement of the throw arm. If but little movement is required, the screw will be turned down and vice versa. When the adjustment screw for the valve throw arm is set for the proper gap, the only other adjustment that is necessary is to turn the end thrust adjustment screw until a good snap is obtained when the friction plate or drive wheel is turned slightly.

The sensitivity of the apparatus may be varied over a relatively wide range by means of the two adjustment screws, and the apparatus may be caused to snap in response to only a slight change in temperature of the helix by restricting the range of movement of the valve plate and adjusting the end thrust of the spring. Conversely, the sensitivity may be decreased by enlarging the range of movement of the valve plate, and adjusting the end thrust so that snapping is not brought about except by a pronounced change in temperature.

As indicated hereinbefore, it is preferable to employ a U-spring in the construction of the apparatus of my invention, but other forms of compressible springs may be employed, the spring being so mounted that it is compressed so that slight movement causes it to snap through a dead center position.

In some instances, as when the device is used as a snap action thermostat on a gas water heater control, the overriding clutch action made possible by the slippage between the end of the spring and the friction plate may be unnecessary or undesirable. In such case, the friction plate may be notched to receive the end of the spring or a lever equivalent to the notched plate may be employed. The action of the modified apparatus remains the same except that overriding and slippage is avoided, since the end of the spring remains in the notch and provides positive temperature control.

However, it may be desirable to provide the modified apparatus with an adjustable fulcrum, so that adjustment for various water temperatures can be made. Thus, the apparatus may be so constructed that the axle 20 may be moved up or down, for example, by having the notches 20A, 20B on a vertically slidable plate (not shown) the height of which is controlled by an adjusting knob or the like projecting through the body of the apparatus.

I claim:

1. In a thermostatic control mechanism provided with flow-interrupting means, the combination which comprises a U-spring attached to said means, a rotatable friction plate against a major surface of which the free end of the U-spring bears eccentrically, the axis of rotation of the plate being transverse to the surface against which the free end of the U-spring bears, a thermally-responsive element, and means for rotating the friction plate in one direction as the element is heated and in the reverse direction as the element is cooled.

2. In a thermostatically-controlled flow-regulating mechanism, the combination which comprises a lever adapted to open and close the mechanism, a U-spring mounted on said lever, a rotatable friction plate having a major surface against which the free end of the U-spring bears eccentrically, the axis of rotation of the plate being transverse to the surface against which the free end of the U-spring bears, a thermally-responsive element, and means for rotating the friction plate in one direction as the element is heated and in the reverse direction as the element is cooled.

3. In a thermostatically-controlled valve mechanism, the combination which comprises a lever adapted to open and close the valve, a U-spring lying substantially parallel to the plane of movement of the lever and having one end mounted thereon and a free end projecting outwardly, a rotatable friction plate having a major surface against which the free end of the U-spring bears eccentrically, the axis of the rotation of the U-spring being transverse to the major surface, a thermally-responsive element, and means for rotating the friction plate in one direction as the element is heated and in the reverse direction as the element is cooled.

4. In a thermostatically-controlled valve mechanism, the combination which comprises a lever adapted to open and close the valve, a U-spring mounted on one end of the lever with an outwardly projecting free end, a rotatable friction plate having a major surface against which the free end of the U-spring bears off center, the surface of the plate on which the spring bears being disposed transverse to the spring and the axis of rotation of the plate being disposed transverse to the surface, a thermally-responsive element, and means for rotating the friction plate in one direction as the element is heated and in the reverse direction as the element is cooled.

5. In a thermostatically-controlled valve mechanism, the combination which comprises a lever adapted to open and close the valve, a U-spring lying substantially parallel to the plane of movement of the lever and having one end mounted on the lever and a free end projecting outwardly from the fulcrum of the lever, a rotatable friction plate against which the free end of the U-spring bears off center, the surface of the plate on which the spring bears being disposed transverse to the spring, a thermally-responsive element, and means for rotating the friction plate in one direction as the element is heated and in the reverse direction as the element is cooled.

6. In a thermostatically-controlled valve mechanism, the combination which comprises a lever adapted to open and close the valve, a valve cap mounted on one end of said lever and adapted to cover the seat of the valve, a U-spring mounted on said lever on the side opposite the valve cap, said U-spring being disposed substantially parallel to the plane of movement of the lever and having a free end projecting longitudinally, a rotatable friction plate against which the free end of the U-spring bears, the axis of rotation of the plate being remote from the free end of the U-spring, and the surface of the plate on which the spring bears being disposed transverse to the spring, a thermally-responsive element, and means for rotating the friction plate in one direction as the element is heated and in the reverse direction as the element is cooled.

7. In a thermostatically-controlled valve mechanism, the combination which comprises a lever adapted to open and close the valve, a U-spring mounted on one end of said lever, said spring being disposed substantially parallel to the plane of movement of the lever and having a free end extending longitudinally therefrom, a rotatable friction plate the surface of which is disposed transverse to the spring and against which the free end of the spring bears, the axis of rotation of the friction plate being remote from the free end of the spring, a bimetal helix disposed substantially coaxially with the friction plate and adapted to rotate the plate in one direction as the helix is heated and in the reverse direction as the helix is cooled.

8. Apparatus according to claim 7 in which the friction plate is attached to the bimetal helix by a shaft, and the shaft is mounted in relatively loose bearings.

9. Apparatus according to claim 7 in which the bimetal helix is enclosed in a chamber having thermally-conductive walls, the helix being connected to the friction plate by a shaft disposed coaxially with the helix and the friction plate.

10. Apparatus according to claim 7 in which the helix is enclosed in a heat-conductive cylinder, the helix being connected to the friction plate by a shaft disposed coaxially with the helix and the plate, said shaft being enclosed by a tube that is attached to the cylinder.

11. Apparatus according to claim 7 in which the free end of the U-spring is bent outwardly to form a small projection that bears on the friction plate.

12. In a thermostatic control mechanism provided with flow-interrupting means, the combination which comprises a spring attached to said means, a rotatable friction plate having a major surface against which the free end of the spring bears eccentrically, the axis of rotation of the plate being transverse to the major surface, a thermally-responsive element, and means for rotating the friction plate in one direction as the element is heated and in the reverse direction as the element is cooled.

13. In a thermostatic control mechanism provided with flow-interrupting means, the combination which comprises a compressible spring attached to said means, a rotatable member having a major surface against which the free end of the spring bears so that rotation of the member tends to compress the spring and carry said end through a dead center position, the axis of rotation of the member being transverse to the major surface against which the free end of the spring bears, a thermally-responsive element, and means for rotating the member in one direction as the element is heated and in the reverse direction as the element is cooled.

JAMES RICHARD CAMPBELL.